March 13, 1962 T. A. FRISCHMAN 3,024,626
AXLE SHAFT
Original Filed April 13, 1954 2 Sheets-Sheet 1

50-B-50 H STEEL

INVENTOR.
Thomas A. Frischman
BY
Teagro & Stover
ATTORNEY

March 13, 1962 T. A. FRISCHMAN 3,024,626
AXLE SHAFT
Original Filed April 13, 1954 2 Sheets-Sheet 2
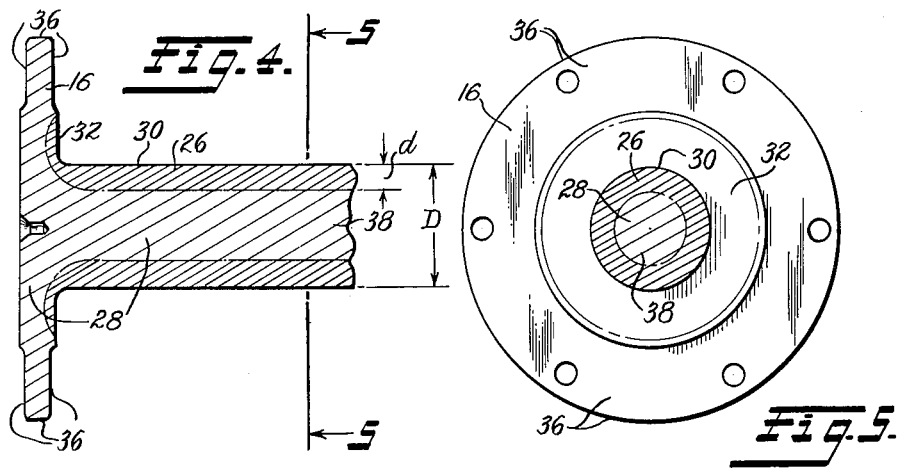
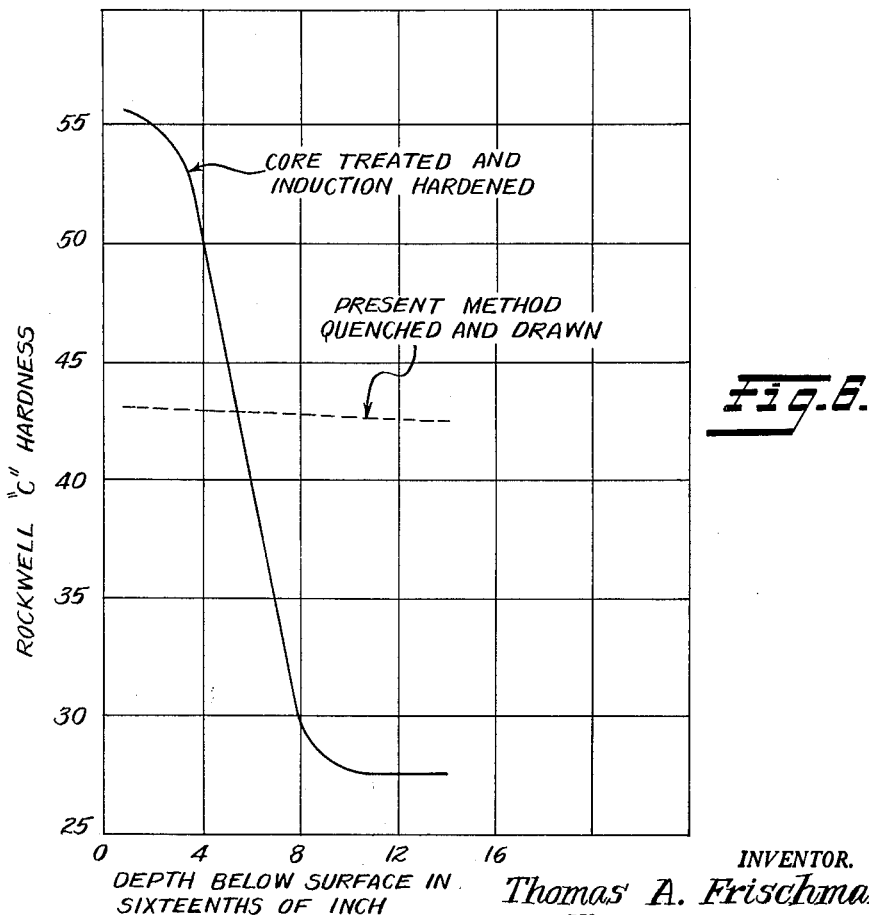
INVENTOR.
Thomas A. Frischman
BY
Teagro & Stove
ATTORNEY

3,024,626
AXLE SHAFT

Thomas A. Frischman, Solon, Ohio, assignor to Eaton Manufacturing Company, Cleveland, Ohio, a corporation of Ohio
Continuation of abandoned application Ser. No. 422,747, Apr. 13, 1954. This application Oct. 2, 1959, Ser. No. 844,080
8 Claims. (Cl. 64—1)

This invention relates to alloy steel axle shafts and the method of manufacturing same and more particularly to axle shafts manufactured from alloy steel stock such as 50–B–50 H steel and an induction hardening method of manufacturing alloy steel axle shafts therefrom.

This is a continuing application of my co-pending United States application for Letters Patent, Serial Number 422,747, for Shaft Manufacture, filed April 13, 1954, now abandoned.

Generally, in the normal methods of manufacturing axle shafts, currently being used by industry, the axle shafts are usually forged, heat-treated complete and then machined to finished size. Such normal types of methods for producing or manufacturing axle shafts generally first forge the axle shaft from an as-rolled bar, quench and temper the forged shaft all over to a final hardness of approximately 363 to 444 Brinell, temper the shaft to facilitate turning, drilling and tapping operations, inspect, straighten, cutoff and center, machine the flange and spline portion, and as optional steps, the surface of the shafts may be belt ground to remove steel defects and shot peened for increased fatigue life.

To further improve the quality of an axle shaft which is manufactured in accordance with the regular type methods currently in use, the body portion of the axle shaft may also be contour ground to remove the bulk of the surface imperfections and magnetically inspected to reveal any seams that may persist after such grinding which may be removed with a grinder and finally shot peened to increase the fatigue resistance of the steel at the surface thereof.

Further, an axle shaft that is manufactured in accordance with the current regular or normal type methods of manufacturing same will have a surface hardness ranging from approximately 363 to 444 Brinell which is at the upper limits for commercial machining. Also, even if the commercial machining problem could be solved such axle shafts could not be brought to a greater hardness since the steel stock normally used in the manufacture of such shafts is a through-hardening type steel which develops apparently the same hardness from the surface to the core or central portion thereof and an increase in such hardness would naturally result in an axle shaft that would be too brittle for practical use.

In recent years, automotive equipment such as trucks, truck-tractors etc., excavating, hauling and construction vehicles, and the like, have been required to accomplish heavier and more fatiguing tasks and deliver greater pay loads which creates a direct burden on and subjects the axle shafts being used in such equipment or vehicle to fatigue failure by exceeding the endurance limit of the steel stock used in the manufacture of the axle shaft with the failure often occurring in the spline roots or the body portion of the axle shaft.

It had been found that in the two major locations of failure in axle shafts which are now generally universally being used and which are manufactured in accordance with the regular or normal methods, described above, i.e., the spline roots and the body portion, that in the spline-type fatigue the failure or fracture progressed from the root fillet inward to the center of the axle shaft which resulted in the eventual breaking or twisting off of the axle shaft.

In the body-type fatigue, the failure usually originated as minute longitudinal cracks which progressed inward faster than lengthwise of the axle shaft. If seams were present the rate of progression of the failure was greatly accelerated. Under continual loading the minute cracks developed rapidly along the surface of the axle shaft until the cross section of the part could no longer withstand the stress and the remaining solid metal "twisted off."

In order to overcome these two major types of fatigue failures, it is necessary to increase the torsional properties of an axle shaft of given size since to increase the size of the axle shaft to be used with a given vehicle would be only a theoretical solution since it would be highly impractical to make a change in the size of the axle shaft after the completion of the design of the given vehicle and during the actual manufacture or production of the axle shaft for use in the given vehicle.

In order to overcome the disadvantages, objections and undesirable results which occur from the use of axle shafts that are manufactured by the normal, current or regular type methods described above, it is desirable to bring about the right combination of high mechanical properties in torsion and high fatigue resistance of an axle shaft plus a good load carrying ability and it has been found that these properties, characteristics and conditions may be acquired by increasing the hardness of the outer peripheral regional surface of the axle shaft and back it up with a tough underlying softer core region with the differential hardness gradient between the peripheral and core regions being controlled both as to the respective hardnesses and the depth and extent of the peripheral region.

Accordingly, it is the primary object of this invention to provide an alloy steel axle shaft having mechanical properties in torsion in combination with higher fatigue resistance which exceed those of other axle shafts, of similar size, which are now available.

A further object of this invention is to provide an alloy steel axle shaft having a controlled differential hardness gradient, i.e., a specific differential hardness gradient between a peripheral region including the axle shaft surface and a central region including the core of the axle shaft with the depth of the hardness of the peripheral region being controlled relative to the diameter of the axle shaft and the surface area extent of the hardness of the peripheral region being controlled relative to the entire surface area of the axle shaft.

Another further object of this invention is to provide an alloy steel axle shaft having a differential hardness gradient, i.e., a hardness gradient between a peripheral region thereof that includes the axle shaft surface and a central region which includes the core of the axle shaft.

A still further object of this invention is to provide an alloy steel axle shaft having a differential hardness gradient between a first region thereof which includes a part of the axle shaft surface and that material of the axle shaft which is immediately adjacent thereto and a second region which includes the remaining part of the axle shaft surface together with the central portion or core of the axle shaft.

An additional object of this invention is to provide an alloy steel axle shaft including a main body portion having a fillet flange portion and a splined portion extending from opposite end portions thereof with a differential hardness gradient between first and second regions of the axle shaft with the first region including the entire surface area of the body portion and the portion of the surface area of the fillet flange portion which is immediately adjacent to the surface area of the body portion together with the surface area of the splined portion and the material of the axle shaft that is immediately adjacent to the surface areas, and the second region including any remaining part of the respective surface areas of the fillet flange and the splined portions together with the central core region of the axle shaft.

A further additional object of this invention is to provide an alloy steel axle shaft having a differential hardness gradient between a surface region and a central region thereof with the surface region having a hardness of between about 495 to 555 Brinell and the central region having a hardness of between about 285 to 321 Brinell.

A more specific primary object of this invention is to provide an alloy steel axle shaft having about 0.47 to 0.54% carbon, 0.65 to 1.10% manganese, 0.20 to 0.35% silicon, .30 to 0.70% chromium, 0.0005% minimum boron, which is more commonly designated as 50–B–50 H steel, and having a regional surface hardness of 495 to 555 Brinell and a core region hardness of 285 to 321 Brinell.

A major object of this invention is to provide an improved method of manufacturing alloy steel axle shafts having high mechanical properties in torsion in combination with high fatigue resistance wherein the improved method insures obtaining the desired properties consistently in all of the axle shafts manufactured in accordance therewith.

A further major object of this invention is to provide an improved method of manufacturing an alloy steel axle shaft having a differential hardness gradient wherein the improved method enables the depth and area extent of the annular high hardness peripheral region of the axle shaft to be controlled.

A still further major object of this invention is to provide an improved method of providing an alloy steel axle shaft with a controlled differential hardness or specific hardness gradient between the peripheral region including the axle shaft surface and the central region including the core of the axle shaft with the improved method insuring that the controlled differential hardness gradient may be reproduced and will be consistent within all axle shafts that are manufactured in accordance therewtih.

Another major object of this invention is to provide an improved method of manufacturing alloy steel axle shafts wherein each of the finished axle shafts have a surface regional hardness of between about 495 to 555 Brinell and a core region hardness of between about 285 to 321 Brinell.

An additional major object of this invention is to provide an improved method for the manufacture of alloy steel axle shafts wherein each of the finished axle shafts will have a differential hardness gradient between a first region which includes a part of the respective shaft surface together with that material which is immediately adjacent thereto and a second region which includes the remaining part of the respective shaft surface together with the central portion or core of the axle shaft.

A further additional major object of this invention is to provide an improved method of manufacturing an alloy steel axle shaft wherein the finished axle shaft will be provided with a main body portion having a fillet flange portion and a splined portion extending from opposite end portions of the body portion with a differential hardness gradient between first and second regions of the axle shaft with the first region including the entire surface area of the body portion and that portion of the surface area of the fillet flange which is immediately adjacent to the surface area of the body portion together with the surface area of the splined portion and the material of the axle shaft that is immediately adjacent the surface areas, and the second region including any remaining part of the respective surface areas of the fillet flange and the splined portions together with the central core region of the shaft.

An additional more specific object of this invention is to provide a method of manufacturing an alloy steel axle shaft from alloy steel stock having about 0.47 to 0.54% carbon, 0.65 to 1.10% manganese, 0.20 to 0.35% silicon, 0.30 to 0.70% chromium, and 0.0005% minimum boron, which is more commonly designated 50–B–50 H steel, with the finished axle shaft having a regional surface hardness of about 495 to 555 Brinell and a core region hardness of about 285 to 321 Brinell.

A principal object of this invention is to provide an improved method of manufacturing alloy steel axle shafts which enables the basic machining operations of such axle shafts to be performed at a relatively low surface hardness prior to providing such axle shafts with the final finished high surface hardness.

A further principal object of this invention is to provide an improved method of manufacturing alloy steel axle shafts which virtually eliminates the danger of developing cracks in the flange fillet and spline portions of such axle shafts during the quenching operation in hardening such portions.

A still further principal object of this invention is to provide an improved method of manufacturing alloy steel axle shafts wherein an axle shaft manufactured in accordance with the improved method will have a high state of compressive stress in the outer annular surface region thereof as compared with axle shafts previously manufactured in accordance with regular normal type methods currently being used.

In order to accomplish and acquire the desired objects and results, as stated above, and to manufacture an alloy steel axle shaft which will possess the necessary conditions, characteristics and properties, the improved method of manufacturing alloy steel shafts, which will be more fully described and disclosed hereafter, is as follows:

(a) Form an axle shaft blank from an as-rolled alloy steel bar, (b) Heat through the axle shaft blank, (c) Quench the axle shaft blank in oil, (d) Temper the axle shaft blank to acquire a desired central or core region hardness, (e) Machine the axle shaft blank as necessary, (f) Induction harden the axle shaft blank by heating the blank to a given depth along a desired surface region to give a first surface hardness, (g) Immediately quench the axle shaft blank, then (h) Temper the axle shaft blank to draw the first surface hardness back to a desired finished surface hardness that differs from the central or core region hardness, (i) Shot peen the axle shaft to increase the fatigue life of the axle shaft, and then (j) Machine the finished axle shaft as necessary.

Other objects and important features of this invention will be apparent from a study of the specification following taken with the drawing, which together show and describe a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

Figure 3:
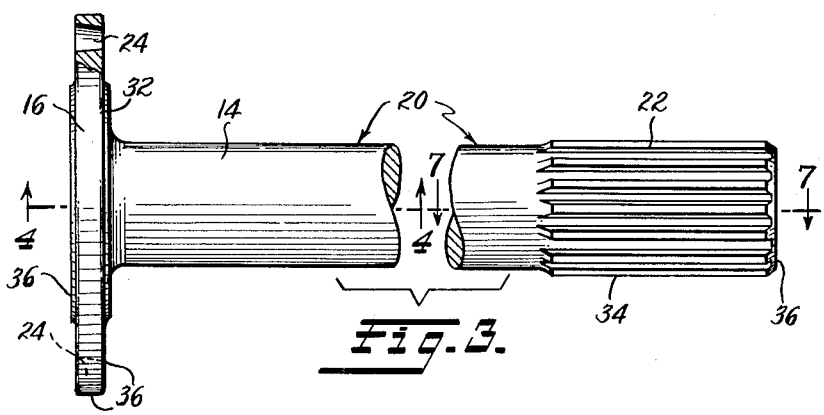
FIGURE 3 is a top elevational view, partly broken away, illustrating a finished alloy steel axle shaft, manufactured in accordance with the improved method or process of this invention and which possesses desired improved high mechanical properties in torsion and high fatigue resistance.
Figure 7:
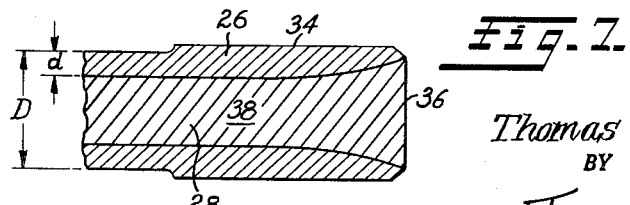

FIGURE 4 is a partial longitudinal sectional view of one axial extremity of the finished axle shaft, taken along the line 4—4 of FIGURE 3 looking in the direction of the arrows, showing a desired controlled hardness pattern of the finished axle shaft and illustrating the differential hardness or hardness gradient between a peripheral region, including a part of the axle shaft surface, and a central region, including the remaining part of the axle shaft surface and the central core portion of the axle shaft;

FIGURE 5 is a transverse sectional view, taken along the line 5—5 of FIGURE 4 looking in the direction of the arrows, illustrating the controlled hardness pattern of the finished alloy steel axle shaft;

FIGURE 6 is a chart illustrating the differential hardness or specific hardness gradient of the finished alloy steel axle shaft, shown in FIGURES 3 to 5 and 7, having the hardness plotted against the depth below the axle shaft surface illustrated by a solid line and a hardness pattern of an axle shaft that is manufactured in accordance with a known, normal or current method shown by a dash-dot line, and FIGURE 7 is a partial longitudinal sectional view, similar to FIG. 4, taken along line 7—7 of FIG. 3 looking in the direction of the arrows, of the other axial extremity of the axle shaft, showing the desired controlled hardness pattern of the finished axle shaft.

Figure 1:
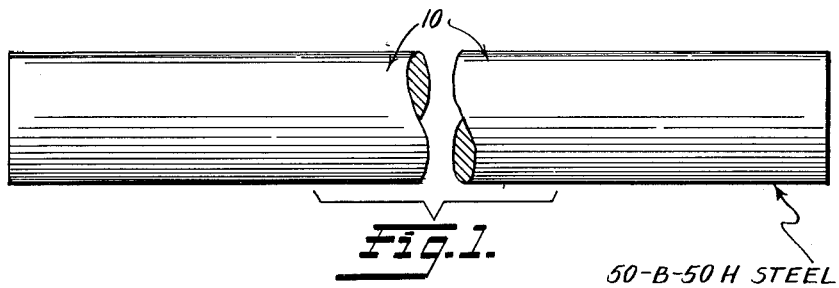
FIGURE 1 is a top elevational view, partly broken away, illustrating an as-rolled alloy steel bar for use in the manufacture of an axle shaft in accordance with the improved process or method of the instant inventive concept.
Figure 2:
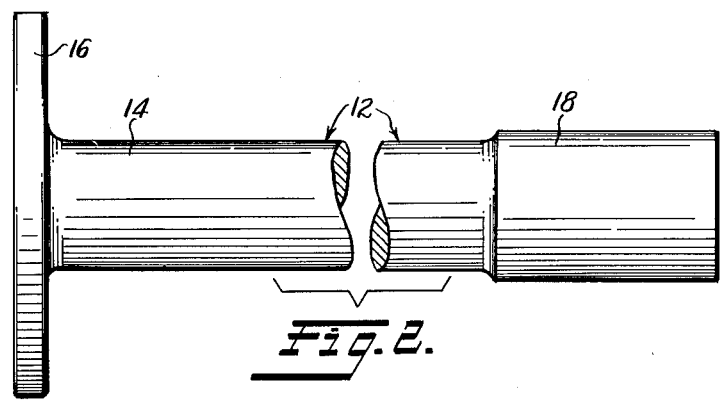
FIGURE 2 is a top elevational view, partly broken away, illustrating an alloy steel axle shaft blank subsequent to the initial forging operation during the manufacture thereof by the improved process or method of the instant inventive concept.

Attention is now directed to the drawing wherein there is illustrated an as-rolled relatively soft alloy steel bar 10, illustrated in FIG. 1, preferably of 50–B–50 H steel stock, which is formed into an alloy steel axle shaft blank 12, as illustrated in FIGURE 2. The axle shaft blank 12 includes an elongated substantially cylindrical major body portion 14 having formed integrally therewith a radially outwardly extending annular disc-like flange fillet portion 16 disposed adjacent one axial extremity of the body portion 14 and an enlarged substantially cylindrical portion 18 disposed adjacent the other axial extremity thereof.

The axle shaft blank 12 is processed by an improved method, to be more fully described and disclosed hereafter, to produce a finished alloy steel axle shaft 20, as illustrated in FIGURE 3, wherein the enlarged portion 18 is provided with longitudinally extending circumferentially spaced splines 22 and the disc-like fillet flange portion 16 is provided with shaft puller holes 24.

Attention is now directed to FIGURES 4, 5 and 7 of the drawing wherein there is illustrated certain desired characteristics, conditions and properties which are possessed by the finished axle shaft 20 which are more particularly illustrated as a first region or an annular outer peripheral zone 26 having a definite desired hardness and a second region or an inner, central zone 28 also having a definite desired hardness which differs from and is less than the previously mentioned hardness of the first or peripheral region 26 to produce a definite hardness differential or specific hardness gradient between the first region or outer zone 26 and the second region or inner zone 28.

As illustrated in FIGS. 3 to 5 and 7, the first region 26 includes a surface area 30 that is the entire surface of the major body portion 14, a part of the fillet flange portion surface area 32, a major part of the enlarged splined portion surface area 34 and the material of the axle shaft 20 which is immediately adjacent to or which underlies the surface areas 30, 32 and 34. The second region 28 includes any remaining part 36 of the surface areas of the fillet flange 16 and splined 18 portions and the entire central core portion 38 of the axle shaft 20. FIGURE 4 illustrates the condition, characteristics and properties of the finished axle shaft 20 at the one axial extremity thereof whereat the disc-like flange portion 16 is disposed, with FIGURE 7 illustrating the condition, characteristics and properties of the finished axle shaft 20 at the other axial extremity thereof whereat the enlarged portion 18 is disposed.

In order to achieve the desired combination of high fatigue resistance and high mechanical properties in torsion, the hardness pattern of the finished axle shaft 20 should be substantially as shown in FIGURES 4 and 7 with the first region 26 of hardness carrying on around the regional surface of the disc-like flange fillet portion 16, extending through substantially the entire longitudinal extent of the regional surface of the major body portion 14 and including the major part of the regional surface of the splined portion 18, note FIG. 7, with the first region 26 terminating within ⅛ to ¼ inch from the end of the other axial extremity whereat the splines 22 are located.

As illustrated in FIGS. 4 and 7, the first region 26 penetrates the body portion 14 of the axle shaft 20 to a depth (d) and it has been found desirable that the ratio between the depth (d) of case or induction hardness should be equal to 0.1715 times the diameter (D) of the axle shaft 20.

FIGURE 6 of the drawing illustrates, in graphic form, the desired control of the differential hardness or hardness gradient between the first 26 and second 28 regions of the finished alloy steel axle shaft 20 and also illustrates and compares the desired conditions, characteristics and properties of the finished axle shaft 20 with a similar axle shaft that is manufactured by a known, normal or current method now being used by industry.

It is believed that FIGURE 6 clearly illustrates that the differential hardness or hardness gradient between the regions 26 and 28, the control of the respective hardnesses of these regions, and the control of the depth (d) and the area of extent of the region 26, as shown by the solid line therein, are not conditions of hardness that are inherent in an axle shaft that is manufactured in accordance with known, current and generally used processes as shown by the dot-dash line thereof.

In order to provide the finished alloy steel axle shaft 20 with the desired characteristics, conditions and properties, discussed above, and to enable the axle shaft 20 to give improved results in operation, the improved process or method by which the axle shaft 20 is manufactured includes an initial step of forging the axle shaft blank 12 from the as-rolled relatively soft alloy steel bar 10.

In actual practice, it has been found desirable while practicing the instant method or process for the manufacture of an alloy steel axle shaft to use an alloy steel stock such as that which is more commonly designated as A.I.S.I. 50–B–50 H having an analysis substantially as follows:

50–B–50 H

| | Percent |
|---|---|
| C | 0.47–0.54 |
| Mn | 0.65–1.10 |
| Si | 0.20–0.35 |
| Ni | |
| Cr | 0.30–0.70 |
| Mo | |
| B | 0.0005 minimum |

After the as-rolled alloy steel bar 10 has been forged into the initial axle shaft blank 12, the axle shaft blank 12 is heated through to a temperature of approximately between 1500 to 1550 degrees F. and then quenched in oil until the blank 12 reaches a range of approximately between 325 degrees F. to 350 degrees F. A tempering step is then carried out for approximately 1½ hours at a temperature range between approximately 1000 degrees and 1100 degrees F. to yield a hardness within a range of between 285 to 321 Brinell.

Next, as may be necessary, the axle blank shaft 12 may be machined, straightened, cut off and centered, etc.

The fillet flange 16 may then be machined to the configuration as illustrated in FIGURE 3 and the enlarged portion 18 may also be machined to provide the splines 22 thereon.

The axle shaft blank 12 is then subjected to induction hardening by first, induction heating which converts electrical energy into heat by means of a coil. The heat, applied to the alloy steel of the axle shaft blank 12, places the steel in a condition so that when the steel is quickly cooled, the steel immediately becomes harder. Generally, the blank 12 will be heated by induction to a temperature of about 1600 degrees F. in the first region 26 and then quenched. The as quenched or first regional hardness of the first region 26 at this stage of the improved method is between about 600 to 650 Brinell. The blank 12 is then tempered at a temperature range of between approximately 400 and 600 degrees F. for a period of 1 to 1½ hours to draw the axle shaft blank 12 to a final finished regional hardness in the first region 26 of between approximately 495 to 555 Brinell.

To begin the induction hardening operation, three axle shaft blanks 12, of the same part number, are placed in a vertical position in a heating station between centers. The lower centers, which are mounted on a traveling carriage, are drivers and impart circular motion to the blanks to even out the heating and quenching action. The door is then closed and a push button starts the cycle which is completely automatic.

The axle shaft blanks 12 travel upwards, while turning, into an inductor block. When the flange portion 32 comes within a specified distance from the face of the inductor block, travel ceases and current is then applied to the block which heats the fillet areas and shaft section adjacent to the flange portions. After an intentional delay in this position, the head carrying the blanks 12 begins to move downward. At a predetermined interval the quench comes on and sprays forcibly against the heated portion of the blanks 12, thus hardening them as desired. The blanks continue downward through the coil, being progressively heated and quenched over their entire length except for the last ¼ to ⅛ inch of splines 22. This precaution is taken to prevent cracking of the ends of the splines.

By a combination of micro-switches, timers and drive controls, the various sequences of travel-speed up and down, heat input, delay time, quenching time and heat shutoff are precision controlled down to the second.

At the end of the cycle the door is opened, the blanks 12 are removed and placed on an overhead traveling conveyor which carries them through the washing, tempering and spray cooling stations, delivering them, if desired, to the shot peening operation.

After shot peening which doubles the fatigue life, all of the induction hardened finished axle shafts 20 are Brinell tested for hardness 100 percent. They are then straightened, finish machined and inspected.

As stated above, it is necessary to substantially increase the hardness of the first region 26 of the finished axle shaft 20 and back it up with the trough underlying second region or central core 28 in order for the finished axle shaft 20 to possess the desired combination of high fatigue resistance, good load carrying ability, high mechanical properties in torsion, etc. By reason of the improved method or process described and disclosed above it is possible to heat the outer first region 26 to any desired depth and over selected certain desired surface areas, leaving the second region 28 of the prior structure undisturbed, and thereby provide a definite control over the depth of the first region 26. Also, the degree of hardness to which the heated first region 26 may be raised is also controlled so that the differential hardness or hardness gradient between the first 26 and second 28 regions may definitely and actually be controlled both to the depth and extent of the first region 26 and also to the degree of hardness desired in both of the respective regions.

By means of such control, the improved method insures consistently obtaining the desired characteristics and properties together with the ability to reproduce the desired characteristics, conditions and properties in all of the finished alloy steel axle shafts 20 which may be manufactured in accordance with this improved method.

In actual practice, in following the improved method or process for the manufacture of the axle shafts 20, as described and disclosed above, it has been found that better results are acquired in the finished axle shaft 20 and it is desirable when employing a 50–B–50 H steel for the axle shaft blank 12 to heat through the blank 12 nearer to the upper range of temperature, i.e., 1550 degrees F., and to temper the blank 12 nearer to the lower range of temperature, i.e., 1000 degrees to 1100 degrees F., with the hardness of the second region or central core portion 28 being between 285 to 321 Brinell. Also, during the induction hardening operation it has been found that better results are acquired in the finished axle shaft 20 and it is desirable to immediately quench and then temper the blank 12 between approximately 450 degrees to 525 degrees F. with the resulting first region or peripheral regional surface area 26 having a hardness of 495 to 555 Brinell which converts to 51–55 Rockwell C.

Results of competitive tests made on axle shafts from like alloy steel stock but using the subject induction hardening process and the regular known process, mentioned above, currently being used in industry show a remarkable increase in fatigue life and torsional properties, as illustrated by the following table:

|  | Method—Regular-current | Method—Induction hardening |
| --- | --- | --- |
| Steel | 50–B–50 H | 50–B–50 H. |
| Shaft diameter range | 1.5–1.9 inches | 1.5–1.9 inches. |
| Yield strength (torsional) | 100,000–115,000 p.s.i. | 120,000–135,000 p.s.i. |
| Ultimate torsional strength | 130,000–150,000 p.s.i. | 170,000–200,000 p.s.i. |
| Twist at yield point | 22–26 degrees | 30–35 degrees. |
| Total twist | 400–900 degrees | 200–400 degrees. |
| Surface hardness | 363–444 Brinell | 495–555 Brinell. |

Other tests further reveal that a finished alloy steel axle shaft 20 having a body diameter of 1⁵⁷⁄₆₄ inches, that is manufactured in accordance with the induction hardening method of the instant inventive concept and which also has a differential hardness or hardness gradient of the order illustrated by the solid line of FIGURE 6, will possess higher torsional strength and higher fatigue-resisting properties than an axle shaft manufactured in accordance with a regular known current type of quench and draw through hardened, from stock, such as S.A.E. 4340 alloy steel, normally generally used for such axle shafts, with such S.A.E. 4340 axle shaft possessing a hardness gradient indicated by the dot-dash line of FIGURE 6. Following is a comparison of a plurality of tests made on one group of axle shafts manufactured from 50–B–50 H alloy steel stock in accordance with the improved method of the instant inventive concept wherein the axle shafts possess the desired characteristics, conditions and properties described and disclosed above and a second group of axle shafts manufactured from S.A.E. 4340 alloy steel in accordance with current, known and regularly used methods. In each instance, all of the axle shafts tested were shot peened and the cycles to initial failure at a torsional stress of 65,000 p.s.i. were four forward, one reverse, approximately twenty-two times per minute through an angle of 45 degrees.

| Steel | Cycles to initial failure at a torsional stress of 65,000 p.s.i. | Location of failure |
|---|---|---|
| Core treated, induction hardened, 50-B-50 H_ | 167,120 | Body. |
| Do | 358,000 | Do. |
| Do | 166,000 | Do. |
| Do | 185,370 | Do. |
| Average | 219,120 | |
| Quenched and drawn, through hardened, 4340. | 24,000 | Splines. |
| Do | 20,000 | Do. |
| Do | 22,000 | Do. |
| Average | 22,000 | |

It is believed that the comparisons made immediately above further illustrate that an axle shaft made from a lower alloy content steel stock, such as 50-B-50 H, if manufactured in accordance with the method of the instant inventive concept will actually, in fact, out-perform an axle shaft, of like size, made from a more highly alloyed steel stock, such as S.A.E. 4340, which is a comparatively expensive chrome-nickel-molybdenum steel, which is manufactured in accordance with the normally used known processes of quench and draw, through-hardened.

Further tests reveal that plain carbon steels, such as S.A.E. 1045, C 1033, etc., when subjected to the method of the instant inventive concept will not possess or have the desired characteristics, conditions and properties as described and disclosed above since such plain carbon steels will not harden to the greater depth required so that the differential hardness or hardness gradient between the regions of a plain carbon steel axle shaft, i.e., the hardness gradient between the surface and the core, will fall to the left and below the solid line of FIGURE 6 with such plain carbon steel axle shaft possessing a low torsional yield strength and a very low core or second region hardness.

It has further been determined from actual service records of field tests, that the alloy steel axle shafts 20, made in accordance with the teachings of the instant inventive concept have (a) at this writing been completely free from failures and (b) have traveled from 48% to 187% more miles, under working conditions, than the average life of regularly produced currently available axle shafts operating under the same working conditions.

While the invention has been described and disclosed in terms of an embodiment which it has assumed in actual practice, the scope of the invention should not be deemed to be limited by the precise embodiments herein shown, such other embodiments being intended to be reserved especially as they fall within the scope of the claims here appended.

I claim as my invention:

1. An alloy steel axle shaft having 0.47 to 0.54% carbon, 0.65 to 1.10% manganese, 0.20 to 0.35% silicon, 0.30 to 0.70% chromium, 0.0005% minimum boron, less than 0.065% impurities and the balance iron, a part of the axle shaft surface having a hardness of between 495 to 555 Brinell with the remaining part of the axle shaft surface having a hardness of between 285 to 321 Brinell.

2. An alloy steel axle shaft having an elongated main body portion of substantially circular cross-section, an annular fillet flange extending generally laterally outwardly from adjacent one end portion of the body portion, an enlarged portion having generally axially extending splines thereon adjacent the other end portion of the body portion, said axle shaft having a differential hardness gradient between first and second regions, said first region including the entire surface of the body portion and that part of the surface of the fillet flange that is immediately adjacent to the surface of the body portion together with the surface of the enlarged portion and that material of the axle shaft which is immediately adjacent to the said surfaces, said second region including any remaining part of the surfaces of the fillet flange and the enlarged portion together with the central core region of the axle shaft.

3. The alloy steel axle shaft as set forth in claim 2 wherein said first region has a depth along the body portion of the axle shaft of approximately 0.1715 times the diameter of the body portion of the axle shaft.

4. An axle shaft having a differential hardness gradient between at least two regions thereof, one of said regions having a hardness between about 495 to 555 Brinell and including a part of the shaft surface and that material of the shaft that is immediately adjacent thereto, another of said regions having a hardness between about 285 to 321 Brinell and including the remaining part of the shaft surface and the central core region of the shaft.

5. An axle shaft having a differential hardness gradient between at least two regions thereof, one of said regions including a part of the shaft surface and that material of the shaft that is immediately adjacent thereto, another of said regions including the remaining part of the shaft surface and the central core region of the shaft.

6. The axle shaft as set forth in claim 5 wherein said one region has a depth along said part of the shaft surface of approximately 0.1715 times the lateral width of the axle shaft.

7. An elongated axle shaft having a plurality of regions each of which has a different hardness, one of said regions including that part of the shaft surface which is intermediate the end portions of the shaft and a part of at least one of the end portions thereof, another of said regions including any remaining part of the end portions of the shaft together with the central core portion thereof.

8. The axle shaft as set forth in claim 7 wherein said one region has a hardness of between 495 to 555 Brinell and the said another region has a hardness of between 285 to 321 Brinell.

References Cited in the file of this patent

UNITED STATES PATENTS

| 885,259 | Kirkland | Apr. 21, 1908 |
| 2,599,575 | Morgan | June 10, 1952 |
| 2,717,846 | Harvey | Sept. 13, 1955 |
| 2,852,422 | Hess | Sept. 16, 1958 |